United States Patent Office 3,473,119
Patented Oct. 14, 1969

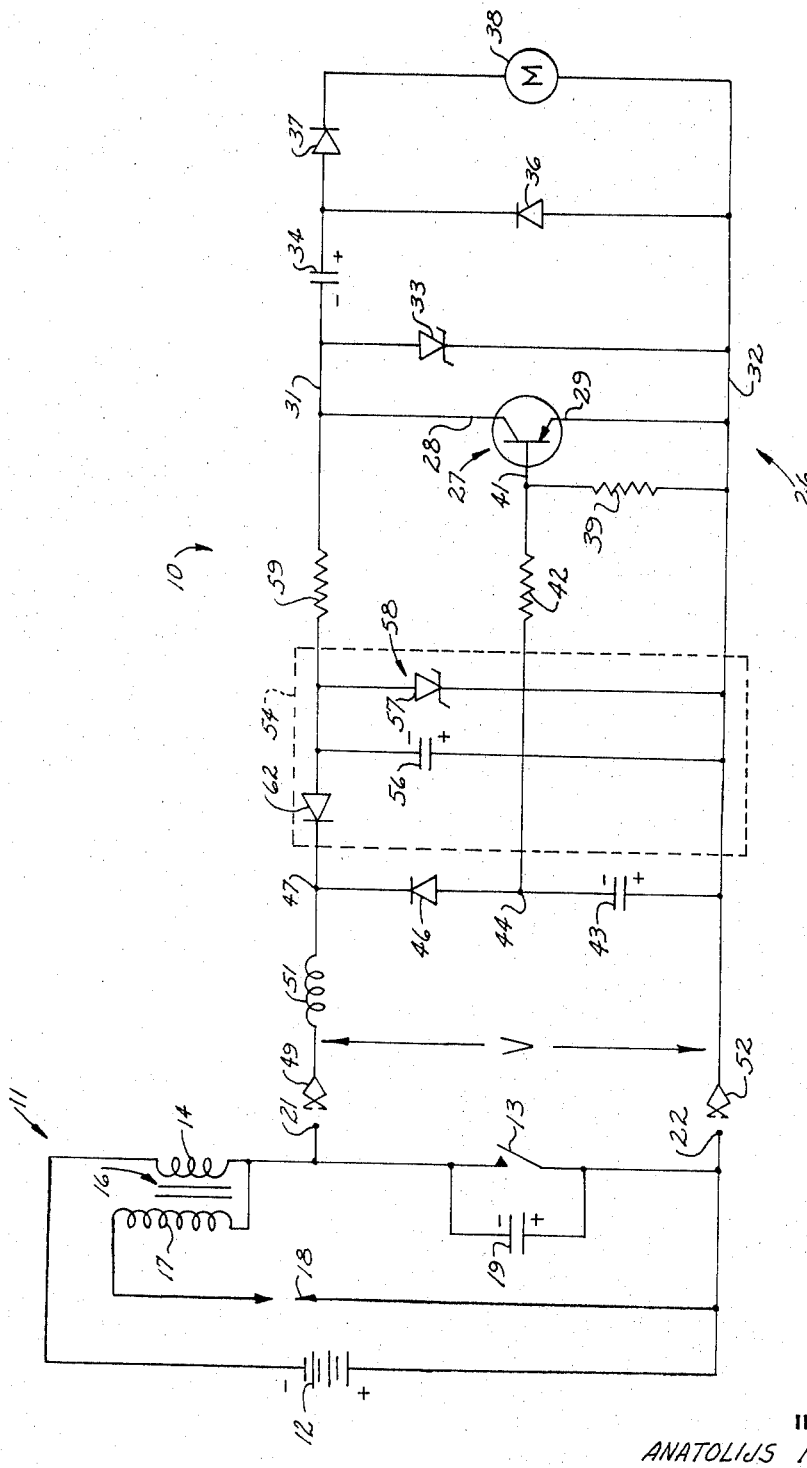

3,473,119
ENGINE TESTING CIRCUIT FOR CONNECTION ACROSS THE IGNITION POINTS OF AN INTERNAL COMBUSTION ENGINE
Anatolijs Mazurkevics, Kalamazoo, Mich., assignor to Allen Electric and Equipment Company, Kalamazoo, Mich., a corporation of Michigan
Filed Oct. 12, 1966, Ser. No. 586,542
Int. Cl. G01r 11/00, 23/02
U.S. Cl. 324—70   4 Claims

ABSTRACT OF THE DISCLOSURE

An engine testing instrument circuit responsive to the electrical conditions in the electrical system of an internal combustion engine wherein a solid state switching device is controlled for causing a preselected amount of current to pass through a current indicator, the rate of current flow being a function of engine speed.

---

This invention relates to a power supply for engine testing equipment and, more specifically, relates to a power supply circuit energizable from the points on the engine supplying the signal to be measured.

The circuit embodying the present invention was particularly designed to supply operating potential for electronic engine testing instruments of the type used in automotive service departments, garages and the like. Such instruments include, for example, tachometers, cam-angle testing devices and the like.

In the past, automotive engine testing instruments have generally obtained operating power from one of several possible sources. For example, certain known prior instruments have contained their own battery, usually a conventional dry cell battery. However, such batteries need frequent attention as for replacement or, in the case of rechargeable batteries, recharging. Thus, considerable time and effort may be spent checking and replacing such batteries which might better be expended in servicing engines. Moreover, such instruments cannot be counted on to be always ready for instant use in view of potential battery failure. Further, such batteries may vary considerably in output voltage after long periods of use or after long periods of inactivity which, depending on the circuit powered thereby, may result in instrument error.

As an alternative, the instrument might be arranged to obtain power from a conventional 110 volt A.C. wall outlet. However, this requires that the instrument be plugged into the wall outlet for its use in addition to being attached to the test points of the engine. The cumulative expenditure of time and effort for plugging the instrument into the socket and unplugging same may be quite considerable over the life of the instrument. In addition, it is likely that the instrument may desirably be used in a location where a 110 volt A.C. outlet is not conveniently or closely available. Also, under some conditions, the use of 110 volt A.C. power may present a shock hazard for the user.

A further alternative would be to power the instrument from the battery of the vehicle, the engine of which is to be tested. However, the mechanic must connect the instrument not only to the test points, but also to the battery, the latter connection requiring a determination of the battery terminal polarity in order that the polarity of the voltage applied to the power input terminals on the instrument be correct. In certain cases, moreover, variations in battery voltage between vehicles or resulting from changes in the load on the battery during testing, as due to the use of the starting motor, may be troublesome.

Accordingly, the objects of this invention include:

(1) To provide a power supply circuit for engine testing equipment.

(2) To provide a circuit, as aforesaid, which can be readily used to power a variety of conventional testing instruments including tachometers, cam-angle testers, and the like.

(3) To provide a circuit, as aforesaid, which is particularly adapted to instruments connected across the ignition breaker points of an internal combustion engine.

(4) To provide an instrument circuit incorporating a power supply, as aforesaid, which instrument circuit requires only a pair of connections to the engine to be tested, in which the signal to be measured is also used to energize the power supply, which requires no connection to the vehicle battery or to a 110 volt A.C. power line and which can be used in remote locations as well as on vehicles having dead or missing batteries.

(5) To provide an instrument circuit, as aforesaid, which requires no internal battery or the like and in which the power supply generally requires no periodic replacement or recharging from a battery charger or the like.

(6) To provide a power supply circuit, as aforesaid, capable of providing substantially the same voltage when used with given engines under varying operating conditions, even over long periods of testing and which, in comparison to batteries, is subject to substantially no aging effects.

(7) To provide an instrument circuit, as aforesaid, instantly capable of use upon connection to the engine to be tested.

(8) To provide a power supply circuit, as aforesaid, which could readily be included in new instruments during manufacture without significant increase in cost or added to existing instruments in the field in the place of existing internal batteries or the like, which is capable of installation in a very small space, and which has few parts, which parts are widely available at low cost.

(9) To provide a power supply circuit, as aforesaid, capable of trouble-free performance over a long service life without maintenance and which is easily maintained by persons familiar with instrument circuitry of the general type with which such power supply is normally to be used.

Further objects and purposes of this invention will be apparent to persons acquainted with apparatus of this general type upon reading the following specification and inspecting the accompanying drawing.

The drawing is a schematic diagram of an instrument circuit embodying the invention and, for purposes of illustration, disclosing a portion of the electrical circuitry of an internal combustion engine to which the instrument circuit can be connected.

Certain terminology will be used in the following description for convenience in reference only and will not be limiting. The words "upwardly," "downwardly," "rightwardly" and "leftwardly" will designate directions in the drawing. Said terminology will include the words above specifically mentioned, derivatives thereof and words of similar import.

GENERAL DESCRIPTION

In general, the objects and purposes of the invention are met by providing an instrument circuit including a capacitor and Zener diode connected in parallel to form a network and a diode connected to one side of the network for controlling the direction of charging current flow from the capacitor, said network and diode comprising a power supply. The opposite ends of the diode and network are connectible to the test points on the engine to be tested for energizing the power supply. The power input terminals of the sensing circuit of the instrument circuit are connected across the network for obtaining unidirectional operating potential therefrom. The signal input terminals of the sensing circuit are connected to the test points of the engine through the leads used to energize the power supply.

DETAILED DESCRIPTION

Turning now to the drawing, an instrument circuit 10 embodying the invention is connected to a pair of points in a conventional internal combustion engine ignition system of any desired type, a portion of which is shown at 11. The ignition system 11 is shown, for purposes of illustration, to include a battery 12 of any convenient type. The battery 12 is connected in series with a set of breaker points 13 across the primary winding 14 of an ignition coil 16. The high voltage secondary winding 17 of the ignition coil 16 is connected in series with at least one spark plug generally indicated at 18, the secondary 17 and spark plug 18 being connected across the breaker points 13. If desired a capacitor 19 may be connected across the breaker points 13. The instrument circuit 10 is connectible to a pair of test points 21 and 22 of the ignition system 11 which, for the particular instrument circuit 10 disclosed to illustrate the present invention, are directly connected to opposite sides of the breaker points 13.

While the power supply unit of the invention may be utilized with a wide variety of specific sensing devices, it will be best understood if considered in connection with one particular sensing circuit associated therewith for illustrative purposes. Therefore, while not implying any limitation in the general use of at least the broader concept embodied in the power supply circuit of the invention, it is hereinafter for illustrative purposes shown and described in connection with a tachometer circuit and more particularly a transistorized tachometer circuit. The tachometer circuit will be described first in order to make clear the function and relationship of the power supply unit to both said tachometer circuit and to the ignition circuit of the internal combustion engine with which it is to be used.

Therefore, turning to the sensing unit 26, same in this illustrative embodiment includes a transistor 27, the collector 28 and emitter transistor 27 is of the PNP type which is made conductive by a negative potential on its base. A Zener diode 33 is connected across lines 31 and 32, the anode thereof being connected to the line 31. A capacitor 34 and diode 36 are connected in series across the Zener diode 33, the anode of the diode 36 being connected to the line 32 and, thus, to the cathode of the Zener diode 33. A further diode 37 and a read-out device 38 which, in the particular embodiment shown, is a conventional D.C. ammeter, are connected in series across the diode 36, the anode of the diode 37 being connected to the cathode of the diode 36. The arrangement of the Zener 33, capacitor 34, diodes 36 and 37 and meter 38 is broadly similar to although different in detail from tachometer circuitry disclosed in my copending application Ser. No. 355,002, now abandoned.

A bias resistor 39 connects the base 41 of the transistor 27 to the line 32. A further resistance 42 connects the base 41 through a junction point 44 to the upper electrode of a capacitor 43, the lower electrode of which is connected to the lower power supply line 32. Capacitor 43 is relatively small and functions to prevent transients or other spurious signals, from operating the transistor 27 and thereby to render the circuit more stable. A diode 46 connects between the junction point 44 and a further junction point 47, the anode of the diode 46 being connected to the junction point 44. Suitable means engageable with the terminal 21, here indicated as a clip 49, connects through a choke 51 with the junction point 47. The line 32 is connectible to the terminal point 22 through a similar clip 52.

Turning now to the power supply circuitry of the invention and integrating same into and with the conventional circuitry above described, said power supply circuit 54 preferably includes a relatively large capacitor 56 and a Zener diode 57 connected in a parallel network generally indicated at 58. The lower plate of the capacitor 56 and the cathode of the Zener 57 are connected directly to the line 32. The upper plate of the capacitor 56 and the anode of the Zener 57 connect through a dropping resistor 59 to the line 31 and, hence, to the collector of the transistor 27. The power supply circuit 54 further includes a diode 62 the anode of which is connected to the upper plate of the capacitor 56 and the cathode of which is connected to the junction point 47.

OPERATION

The operation of the power supply of the invention is best understood when considered in connection with the operation of both the engine ignition system and in connection with the operation of a particular sensing unit, in this embodiment the tachometer circuit 26. Therefore, the operation of the entire system illustrated and above described will be traced, even though the operation of the ignition circuit and of the tachometer circuit above described is conventional and well known.

With the ignition points 13 closed, the battery 12 normally places a negative potential on the upper end of the primary winding 14 of the coil 16 with respect to the bottom end thereof. When the points 13 open, the collapse of the field in the coil 16 causes a change in the voltage drops across the primary 14 of sufficient magnitude as to result in the lower terminal of the breaker points 13 becoming positive with respect to the upper terminal thereof. As a result, the capacitor 19 charges to the polarity shown in the drawing. Thus, the test point 22 becomes positive with respect to the test point 21. The clips 49 and 52 when clipped to the test points 21 and 22, respectively, apply the voltage drop V appearing thereacross to the input of the instrument circuit 10.

Inasmuch as the voltage V is created by a collapsing field in the coil 16 it will be of magnitude substantially in excess of, often several times greater than, the voltage of the source 12. Thus by utilizing the voltage developed from the collapsing field of coil 16, the power supply circuit 54 may be caused to produce a voltage at a magnitude substantially higher than that of the source 12.

As a result of the voltage V, charging current passes from the clip 52 through the capacitor 56 and through the diode 62 and choke 51 to the upper clip 49. The choke 51 limits the effects of high frequency transients on the charging of the capacitor 56 while the diode 62 prevents voltages of reverse polarity, appearing scross the terminals 21 and 22, from changing the charge on the capacitor 56. The Zener diode 57 maintains the voltage appearing across the capacitor 56 below a predetermined maximum. The charging of the capacitor 56 to the maximum limit set by the Zener 57 takes place within a relatively short time and before the capacitor 19 becomes appreciably discharged. The polarity of the charged capacitor 56 is indicated in the drawing, the bottom plate thereof being positive with respect to the upper plate thereof. The potential derivable from said capacitor 56 is the power source from which the desired sensing unit, here the tachometer circuit 26, may be operated in response to operation of the transistor 27.

Now turning in detail to the operation of said power unit circuit in cooperation with, for illustrative purposes, the tachometer circuit illustrated, and commencing with the breaker points 13 in closed condition, it will be recognized that a field will build up on the coil 14 in the usual manner. Opening of said breaker points 13 will cause the field on the coil 14 to collapse and, as above outlined, effect a charging of the capacitors 43 and 56. There is no appreciable simultaneous charging of the capacitor 34 because the resistor 59 which is of a magnitude sufficient to prevent appreciable charging of the capacitor 34 in view of the extremely short duration of the pulse caused by the collapsing of the field at the winding 14. Simultaneously, since the capacitor 43, being small, charges almost immediately, the base 41 of the transistor 27 is biased to render the said transistor conductive but inasmuch as there is yet no appreciable charge on the capacitor 34, no noticeable action will take place.

Upon again closing of the breaker points 13, the voltage between clips 49 and 52 will diminish and, with the discharging of capacitor 43 through the resistors 42 and 39 which occurs very quickly, the transistor 27 becomes nonconductive. Simultaneously, the charge on the capacitor 56 will act through the diode 36 to charge the capacitor 34 to a limit set by Zener diode 33.

Now when the breaker points 13 again open, the above-outlined steps effecting a recharging of the capacitors 43 and 56 will again occur and the transistor 27 again becomes conductive. This will permit a flow of current from one plate of the capacitor 34 through the diode 37, the meter 38 and the transistor 27 to the other plate of the capacitor 34. Upon reclosing of the breaker points 13, the capacitor 43 will again discharge, the transistor will become nonconductive and the pulse through the meter 38 will terminate. Reopening of the breaker points repeats the cycle.

Thus, the charge on capacitor 56 will be maintained by repeated pulses therethrough each time the breaker points 13 open and said charge will be maintained at a level sufficient to effect a charge on the capacitor 34 each time the transistor 27 becomes nonconductive. Hence, the alternate rendering of the transistor conductive and nonconductive effects successive pulses through the meter 38 whose frequency is proportional to the frequency of operation of the breaker points 13 which in turn is a function of the rate of rotation of the engine by which said breaker points are being driven. Hence, the meter 38 provides a reading proportional to engine speed and serves as a tachometer.

Since the capacitor 56 is preferably of much larger magnitude than the capacitor 34, said capacitor 56 will remain at a substantially constant charge while capacitor 34 becomes charged and discharged as above set forth.

It should be emphasized that the power supply circuit 54 disclosed hereinabove can be used to power sensing circuits of a variety of types other than the tachometer circuit 26 disclosed above, the tachometer circuit 26 being employed only to illustrate the invention.

The embodiments of the invention in which an exclusive property or privilege is claimed are defined as follows:

1. In a tachometer circuit for connection across the ignition points of an internal combustion engine, the combination comprising:
   a relatively large capacitor and a Zener diode connected in parallel with said capacitor to form a constant maximum voltage network;
   a diode connected anode-to-anode with said Zener diode and transient limiting means having a first end connected to the cathode of said diode and a second end connected to one side of the points while the cathode of said Zener diode is connected to the other side of the points, said capacitor charging through said diode and transient limiting means in response to a voltage drop in one direction across said points to a voltage maximum limited by said Zener diode;
   a transistor having collector and emitter terminals connected across said Zener diode and means connecting the base of said transistor to one side of said capacitor for biasing said transistor in a nonconductive condition;
   means responsive to the voltage drop across said ignition points for overcoming said bias once for each cycle of operation of the points and rendering said transistor conductive, said capacitor supplying collector-emitter current for said transistor;
   a current indicator connected in circuit with the emitter-collector circuit of said transistor and means responsive to conduction of said transistor for causing a preselected amount of charge to pass through said current indicator, the rate of current flow through said current indicator thus being a function of engine speed.

2. The device defined in claim 1, in which said means overcoming said bias comprises a series connected capacitor and diode having one end connected to the first end of said transient limiting means and a second end connected to the other side of the points to allow a charging of said series connected capacitor as a result of said voltage appearing across said points, and means connecting said series connected capacitor to the base of said transistor for firing said transistor when charged.

3. The device defined in claim 1, in which said means responsive to the conduction of said transistor comprises a series connected diode and capacitor connected in parallel with the collector-emitter terminals of said transistor, a further Zener diode connected in parallel with the series connected diode and capacitor, said series connected diode allowing the charging of said series connected capacitor in one direction as a result of said voltage to a level determined by said further Zener diode, said current indicator comprising a D.C. current meter, and a further diode connected in series with said D.C. current meter, said further diode being connected in parallel with said series connected diode, conduction of said transistor raising the potential on both sides of said series connected capacitor to cause discharge thereof through said current indicator.

4. In an engine testing instrument circuit responsive to electrical pulses occurring across the ignition points in the electrical system of the engine, the combination comprising:
   a chargeable capacitor;
   a Zener diode connected in parallel with said chargeable capacitor to limit the maximum voltage applied across said chargeable capacitor;
   a diode connected in a series circuit with said parallel chargeable capacitor and Zener diode and in back-to-back relationship with said Zener diode;
   connecting means for connecting said series circuit across the ignition points of the engine to permit the ones of said pulses appearing across said ignition points having the proper polarity to pass through said diode to charge said chargeable capacitor to a limit determined by said Zener diode;
   a transistor having collector and emitter terminals connected across said parallel Zener diode and chargeable capacitor and the base electrode thereof connected to means biasing said transistor in a normally nonconductive condition, said capacitor supplying collector-emitter current for said transistor;
   a further chargeable capacitor connected at one side to the emitter terminal side of the series circuit and at the other side to said base electrode, said further chargeable capacitor becoming charged once for each cycle of operation of said ignition points to overcome the bias on said transistor to place said transistor into a conductive condition;
   means including an indicator connected in circuit with the collector and emitter of said transistor and responsive to the conductive condition of said transistor for passing a preselected amount of charge through said indicator for each cycle of operation of said ignition points and thereby providing an output which is a function of the engine speed.

References Cited

UNITED STATES PATENTS

| | | | |
|---|---|---|---|
| 3,202,910 | 8/1965 | Fathauer | 324—70 |
| 3,219,926 | 11/1965 | Dion | 324—70 |
| 3,283,247 | 11/1966 | Beller | 324—70 |
| 3,369,178 | 2/1968 | Wilson | 324—70 |
| 3,374,431 | 3/1968 | Westberg | 324—70 |

RUDOLPH V. ROLINEC, Primary Examiner
MICHAEL J. LYNCH, Assistant Examiner

U.S. Cl. X.R.

324—78